J. C. WHITE.
EYE SHADE.
APPLICATION FILED SEPT. 6, 1912.
1,149,706.
Patented Aug. 10, 1915.
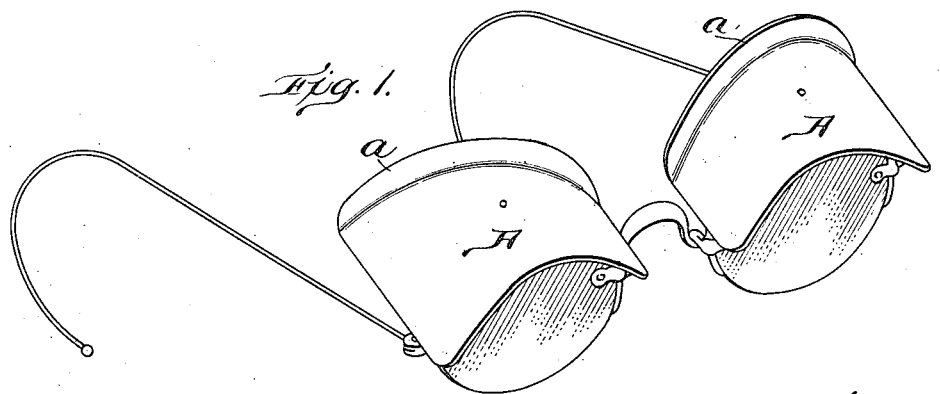
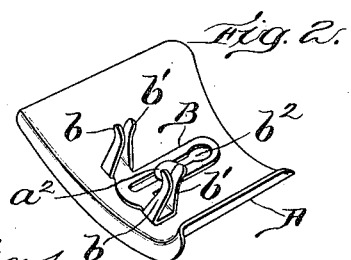
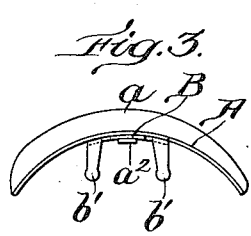
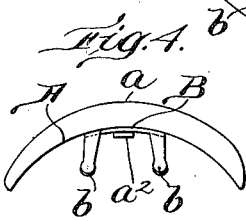
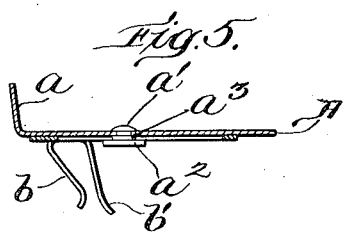
Witnesses:
C. L. Rogers
V. W. Lawrence
Inventor:
Joseph C. White

UNITED STATES PATENT OFFICE.

JOSEPH C. WHITE, OF CHELSEA, MASSACHUSETTS.

EYE-SHADE.

1,149,706.  Specification of Letters Patent.  Patented Aug. 10, 1915.

Application filed September 6, 1912. Serial No. 719,027.

*To all whom it may concern:*

Be it known that I, JOSEPH C. WHITE, a citizen of the United States, residing at Chelsea, in the county of Suffolk and State of Massachusetts, have invented certain new and useful Improvements in Eye-Shades, of which the following is a specification.

My invention relates to eye-shades, and it has for its object to provide an improved device of this kind.

Eye-shades, as heretofore constructed, have been clumsy and inconvenient, as well as uncomfortable in hot weather; moreover, they generally have not been made of such a form and size as would allow of their being carried conveniently in a pocket of a garment, which fact, of course, limited their usefulness.

My invention aims to provide a small and compact eye-shade attachment for spectacles and the like, which will not be clumsy or uncomfortable in hot weather; which can be carried conveniently in a pocket of a garment, and which can be applied to or removed at will from the spectacles.

In accordance with my invention, I provide two independent canopies or shades, one for each eye, each of said canopies being provided with means for detachably fastening it to a pair of spectacles or the like. In this way I make use of the spectacles or the like as a temporary holder for the canopies, and am enabled thereby to make the latter sufficiently small to permit of their being carried conveniently about the person when not in use, and at the same time to so shape and construct them as to obtain a better eye-shading effect than heretofore.

In the best form of my invention the attaching means by which the canopy is secured to the spectacles or eyeglasses, is so constructed as to permit of said canopy being adjusted relatively to the spectacles or eyeglasses in order to position said canopy with relation to the forehead or brow of the wearer. This adjustability, while not essential, is, nevertheless, a feature of considerable practical importance because of the wide variation in size and shape of brows, and in the relation of the latter to the noses of different wearers of spectacles or eyeglasses, and, through this adjustability, my new eye-shade may be adapted to any special requirements in this respect.

In the accompanying drawings: Figure 1 is a perspective view of a pair of spectacles equipped with a pair of my new eye-shades. Fig. 2 is a perspective view of the underside of one of my new shades. Figs. 3 and 4 are, respectively, front and rear elevations of one of my new shades. Fig. 5 is a longitudinal sectional view of one of the shades. Fig. 6 is a top plan view of the shade shown in Fig. 2.

My new eye-shade comprises a canopy A made from a piece of sheet metal, celluloid, or other suitable material, that is bent into the arched form shown, and provided with an upturned lip or flange along its rear edge. This flange not only stiffens the shade so that very thin sheet material may be used but it also increases the eye shading capacity of the canopy, as will be pointed out later.

Near its middle the canopy A is provided upon its top side with a stud $a'$ having a relatively large head $a^2$ and a relatively small shank $a^3$, and this stud holds in place a metallic clip B made with two pairs of lens-engaging spring clamping fingers $b$, $b'$ adapted to embrace and grip a lens at two separated points, one pair of said fingers at each side of the middle portion of the lens so that neither pair is directly in front of the eye when the shade is in use. These lens-gripping fingers are also canted forward, somewhat, relatively to the canopy A, so that when the shade is applied to a lens it is supported by the fingers $b$, $b'$ in the slanting position shown in Fig. 1, that is, with the front portion of the shade lower than the rear portion.

The clip B is made from thin tempered sheet metal and its body is formed with a button-hole slot $b^2$ which adapts the clip to be engaged with the stud $a'$ as shown clearly in Fig. 2. The body of clip B is made flat so that when it is applied to stud $a'$ it is necessary to spring or bend said body to slide the border of slot $b^2$ under the flange $a^2$ with the result that it holds itself in place by frictional engagement with the stud and canopy. Not only does the construction described provide for adjustment of the clip forward and backward on the canopy A, but it may also be rotatively adjusted on the stud $a'$, as the conformation of the wearer's brow may require. Some eyeglasses are worn closer to the brow than others, and some brows are broader than others, so it will be clear that through the universal lateral adjustment of the clip relatively to the canopy any required lateral adjustment may be secured.

The shade is applied to the spectacles or eyeglasses by sliding the lens in between the fingers $b$, $b'$, and since these fingers frictionally engage the lens, it will be clear that the shade may be also adjusted or set at the desired height above the lens. When in use the canopies A are set so that their rear sides are just clear of the wearer's brow, which position, together with the open space between the canopies affords complete ventilation of the space beneath the latter, thus making my new shades much cooler and lighter to wear, especially in hot weather, than most of the eye-shades heretofore provided.

The flange $a$ extending upwardly from the rear side of each canopy cuts off the light from and shades the space between the canopy and the brow and much greater eye-shading effect is secured by this narrow flange occupying such a position and angular relation with the body of the canopy than by a corresponding area of said body.

What I claim is:—

1. An eye shade comprising a canopy adapted to be supported by the lens of an eyeglass or the like, and means on said canopy for detachably securing it to said lens with provision for adjustment thereof relative to the lens and toward and from the eye of the wearer.

2. An eye shade comprising a pair of arc shaped canopies adapted to be supported by the lenses of a pair of eyeglasses or the like, and means on the concaved side of each canopy for detachably and separately securing the latter to one of the lenses, said means directly engaging the lens and holding the canopy in position above the latter with provision for adjustment of the canopy to fit the brow of the user.

3. An eye shade comprising a pair of separate arc shaped canopies adapted to be supported by the lenses of a pair of eyeglasses or the like, and a clip adjustably secured to the concaved side of each canopy having a pair of spring fingers adapted to grip the upper part of one of the lenses to support the canopy in position above the latter.

In testimony whereof I have affixed my signature, in presence of two witnesses.

JOSEPH C. WHITE.

Witnesses:
C. L. ROGERS,
ARTHUR F. RANDALL.